US009688120B2

(12) United States Patent
Lin et al.

(10) Patent No.: US 9,688,120 B2
(45) Date of Patent: Jun. 27, 2017

(54) CURTAIN BUCKLE DEVICE

(71) Applicant: MACAUTO INDUSTRIAL CO., LTD., Tainan (TW)

(72) Inventors: Paul Lin, Tainan (TW); Wei-Ting Chen, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 293 days.

(21) Appl. No.: 14/509,138

(22) Filed: Oct. 8, 2014

(65) Prior Publication Data

US 2015/0135488 A1 May 21, 2015

(30) Foreign Application Priority Data

Nov. 15, 2013 (TW) ............................. 102221438 U

(51) Int. Cl.
*B60J 1/18* (2006.01)
*B60J 1/20* (2006.01)
*F16B 3/00* (2006.01)

(52) U.S. Cl.
CPC ............... *B60J 1/18* (2013.01); *B60J 1/2055* (2013.01); *F16B 3/00* (2013.01); *Y10T 24/45241* (2015.01)

(58) Field of Classification Search
CPC ......... B60J 1/14; B60J 1/15; B60J 1/16; B60J 1/17; B60J 1/2011; B60J 1/2013; B60J 1/2019; B60J 1/2022; B60J 1/203; B60J 1/2055; B60J 1/2063; B60J 3/02; B60J 3/0204; B60J 3/0213; B60J 3/0217; B60J 3/0221; B60J 3/0226; B60J 3/0239; B60J 3/0252; B60J 3/026; B60J 3/0265; B60J 3/0273; B60J 1/18; F16B 3/00; Y10T 24/45241
USPC .... 160/370.22, 370.21, 310, 23.1, 302, 314, 160/70, 265, 305, 24; 296/97.4, 97.8
See application file for complete search history.

(56) References Cited

U.S. PATENT DOCUMENTS

| | | | | | |
|---|---|---|---|---|---|
| 1,591,739 | A * | 7/1926 | Blake | B60J 1/2041 160/274 |
| 4,836,263 | A * | 6/1989 | Ament | B60J 1/2019 160/370.22 |
| 5,031,682 | A * | 7/1991 | Tedeschi | E06B 9/60 160/315 |
| 5,036,898 | A * | 8/1991 | Chen | B60J 1/2033 160/23.1 |
| 5,054,533 | A * | 10/1991 | Lii | B60J 1/2063 160/23.1 |
| 5,226,467 | A * | 7/1993 | Lii | B60J 1/2033 160/302 |

(Continued)

*Primary Examiner* — James Ference
(74) *Attorney, Agent, or Firm* — Alan D. Kamrath; Kamrath IP Lawfirm, P.A.

(57) ABSTRACT

A curtain buckle device has a buckle unit and a buckle stick. The buckle unit is mounted on a crank and has a buckle tube portion, a buckle hole formed through the buckle tube portion, multiple slits formed in an end of the buckle tube portion at interval, and a buckle claw formed on an inner surface of the buckle tube portion. The buckle stick is inserted into the buckle tube portion and has a stick body inserted into the buckle hole, a fixing end connected with an end of the stick body and mounted on the base, and a buckle groove annularly formed in an outer surface of the stick body. The buckle groove is engaged with the claw bodies. Therefore, the curtain buckle device is provided for a car curtain to use.

8 Claims, 6 Drawing Sheets

(56) References Cited

U.S. PATENT DOCUMENTS

| | | | | | |
|---|---|---|---|---|---|
| 5,271,446 | A * | 12/1993 | Hwang | B60J 1/2033 | 160/120 |
| 5,284,198 | A * | 2/1994 | Kauka | E04F 10/0611 | 160/370.21 |
| 5,291,934 | A * | 3/1994 | Ouvrard | B60J 1/2019 | 160/310 |
| 5,314,053 | A * | 5/1994 | Nishimura | F16D 27/105 | 192/41 S |
| 5,464,052 | A * | 11/1995 | Wieczorek | B60R 5/047 | 160/23.1 |
| 5,468,040 | A * | 11/1995 | Peng Hsieh | B60J 1/2019 | 160/310 |
| 5,615,729 | A * | 4/1997 | Matsumoto | B60J 1/2019 | 160/265 |
| 5,653,278 | A * | 8/1997 | Cheng | B60J 1/2019 | 160/24 |
| 5,690,317 | A * | 11/1997 | Sandsborg | E06B 9/08 | 160/300 |
| 5,752,560 | A * | 5/1998 | Cherng | B60J 1/2019 | 160/22 |
| 5,791,721 | A * | 8/1998 | Lin | B60J 1/2019 | 160/265 |
| 5,896,910 | A * | 4/1999 | Chen | B60J 1/2019 | 160/24 |
| 5,934,354 | A * | 8/1999 | Price | B60R 5/047 | 160/313 |
| 6,032,718 | A * | 3/2000 | Chen | B60J 1/2019 | 160/269 |
| 6,109,330 | A * | 8/2000 | Crisp | B60J 1/2019 | 160/370.22 |
| 6,189,948 | B1 * | 2/2001 | Lin | B60J 1/2019 | 160/310 |
| 6,191,886 | B1 * | 2/2001 | Sinkoff | G03B 21/58 | 160/24 |
| 6,216,762 | B1 * | 4/2001 | Lin | B60J 1/2019 | 160/370.22 |
| 6,763,874 | B1 * | 7/2004 | Chen | B60J 1/2055 | 160/370.22 |
| 7,455,345 | B1 * | 11/2008 | Kim | B60J 1/2019 | 160/370.22 |
| 8,203,658 | B2 * | 6/2012 | Wang | G06F 1/1607 | 242/598.3 |
| 8,276,643 | B2 * | 10/2012 | Ehrenberger | B60J 7/223 | 160/23.1 |
| 8,302,655 | B2 * | 11/2012 | Lin | F03G 1/00 | 160/313 |
| 8,307,879 | B2 * | 11/2012 | Lin | E06B 9/40 | 160/313 |
| 2005/0257903 | A1 * | 11/2005 | Schimko | B60J 1/2027 | 160/370.22 |
| 2005/0275239 | A1 * | 12/2005 | Nakajo | B60J 1/2019 | 296/97.4 |
| 2006/0065375 | A1 * | 3/2006 | Chen | B60J 1/2019 | 160/370.22 |
| 2007/0272375 | A1 * | 11/2007 | Hansen | B60J 1/2027 | 160/370.22 |
| 2008/0006373 | A1 * | 1/2008 | Lin | B60J 1/2025 | 160/321 |
| 2008/0142172 | A1 * | 6/2008 | Hansen | B60J 7/0015 | 160/270 |
| 2009/0000748 | A1 * | 1/2009 | Wu | B60J 1/2055 | 160/39 |
| 2009/0277595 | A1 * | 11/2009 | Gao | B60J 1/2011 | 160/370.21 |
| 2010/0126544 | A1 * | 5/2010 | Wagner | E04F 10/0618 | 135/117 |
| 2010/0175838 | A1 * | 7/2010 | Faller | E06B 9/322 | 160/310 |
| 2011/0209837 | A1 * | 9/2011 | Wieczorek | B60J 1/2013 | 160/314 |
| 2012/0048489 | A1 * | 3/2012 | Oh | B60J 1/2025 | 160/370.22 |
| 2012/0111512 | A1 * | 5/2012 | Katada | B60J 1/2055 | 160/370.22 |
| 2012/0160429 | A1 * | 6/2012 | Lin | B60J 1/2027 | 160/291 |
| 2012/0186758 | A1 * | 7/2012 | Katada | B60J 1/2055 | 160/370.21 |
| 2015/0135488 | A1 * | 5/2015 | Lin | B60J 1/18 | 24/593.1 |

* cited by examiner

CURTAIN BUCKLE DEVICE

BACKGROUND OF THE INVENTION

1. Field of the Invention

The present invention relates to a buckle device, and more particularly to a curtain buckle device.

2. Description of Related Art

To keep sunlight from directly irradiating into a vehicle, a manual or an electric car curtain is often mounted on a rear window of the vehicle. The conventional electric car curtain has a base, a curtain structure, two linking devices and a driving device. The curtain structure has a reel, a curtain body wound around the reel and a top stick connected with an end of the curtain body. Each linking device has multiple cranks pivotally connected with each other. The two linking devices are connected between the top stick and the driving device. One of the cranks of each linking device is pivotally connected with the base by a connecting device. The driving device can drive the top stick to move to fold or expand the curtain body by the linking devices.

With reference to FIG. 6, the conventional connecting device 6 is connected between the crank 3A and the base 1 and has a first pad base 60, a second pad base 61, a stud 62, two nuts 63, 64, two flat pads 65, 66 and a dish washer 67. The first pad base 60 is mounted between the base 1 and the crank 3A of the linking device 3. The second pad base 61 is mounted on the crank 3A. The stud 62 is inserted through the second pad base 61, the crank 3A, the first pad base 60 and the base 1. The nut 63 is mounted in the base 1 and combined with a bottom end of the stud 62. The flat pads 65, 66 and the dish washer 67 are mounted in the second pad base 61 and are mounted around a top end of the stud 62. The nut 64 is combined with the top end of the stud 62 to connect the crank 3A of the linking device 3 on the base 1, such that the crank 3A can be pivotally mounted on the base 1.

However, the structure of the conventional connecting device 6 is complicated and has multiple components. Thus, to assemble the connecting device 6 is time consuming and the cost for the connecting device 6 is high.

Furthermore, the conventional connecting device 6 is connected between one of the cranks 3A of the linking device and the base, such that a tightness between the connecting device 6, the crank and the base after the connecting device 6 is dissembled affects a smoothness of the operations of the linking devices. However, the stud 62 is mounted on the crank 3A and the base by the nuts 63,64, the dish washer 67 and the flat pads 65, 66. Therefore, the tightness of the connecting device 6, the crank 3A and the base cannot be controlled easily. When the tightness is insufficient, the crank 3A is loosening. When the tightness is excessive, the crank 3A is hard to work. Both situations will cause an assembling worker to adjust the connecting device 6 many times.

SUMMARY OF THE INVENTION

The main objective of the present invention is to provide a curtain buckle device to resolve the afore-mentioned problems.

The curtain buckle device is connected between a base and a crank of a linking device. The curtain buckle device has a buckle unit and a buckle stick.

The buckle unit has a buckle tube portion, a buckle hole formed through the buckle tube portion along a longitudinal direction of the buckle tube portion, multiple slits formed in an end of the buckle tube portion at intervals, and a buckle claw formed on an inner surface of the buckle tube portion. The buckle claw has multiple claw bodies formed on the inner surface of the buckle tube portion and respectively located between adjacent two of the slits.

The buckle stick is inserted into the buckle tube portion and has a stick body being cylindrical and inserted into the buckle hole, a fixing end connected with an end of the stick body, and a buckle groove annularly formed in an outer surface of the stick body at a position opposite to the fixing end. The buckle groove is engaged with the claw bodies, such that the buckle unit is rotatable relative to the buckle stick.

Other objectives, advantages and novel features of the present invention will become more apparent from the following detailed description when taken in conjunction with the accompanying drawings.

DETAILED DESCRIPTION OF PREFERRED EMBODIMENTS

Figure 1:
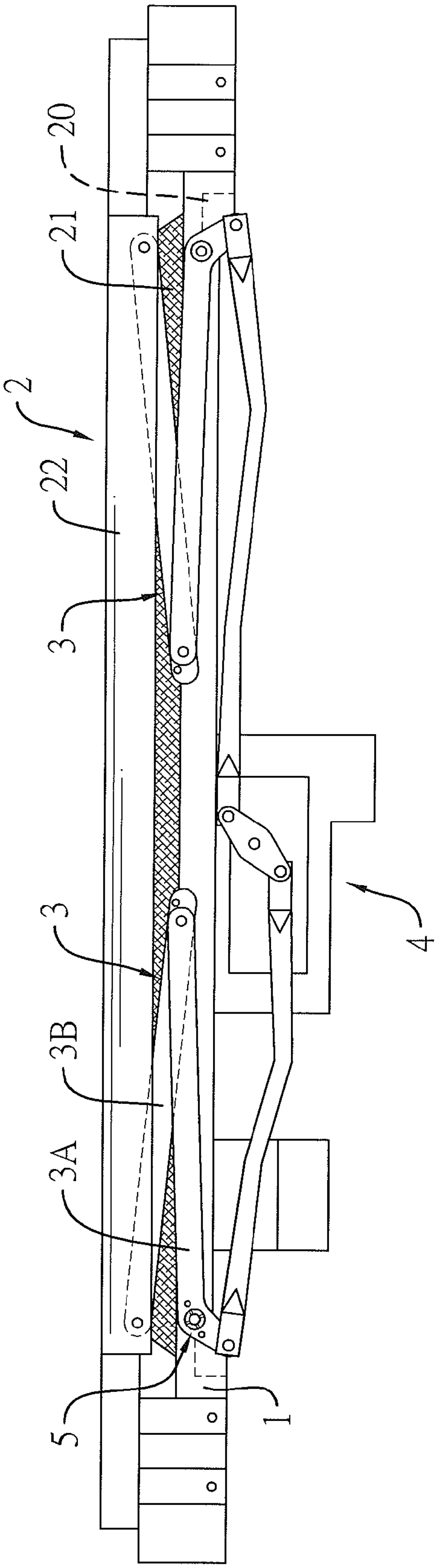
FIG. 1 is a side view of a preferred embodiment of a car curtain with a curtain buckle device in accordance with the present invention.
Figure 2:
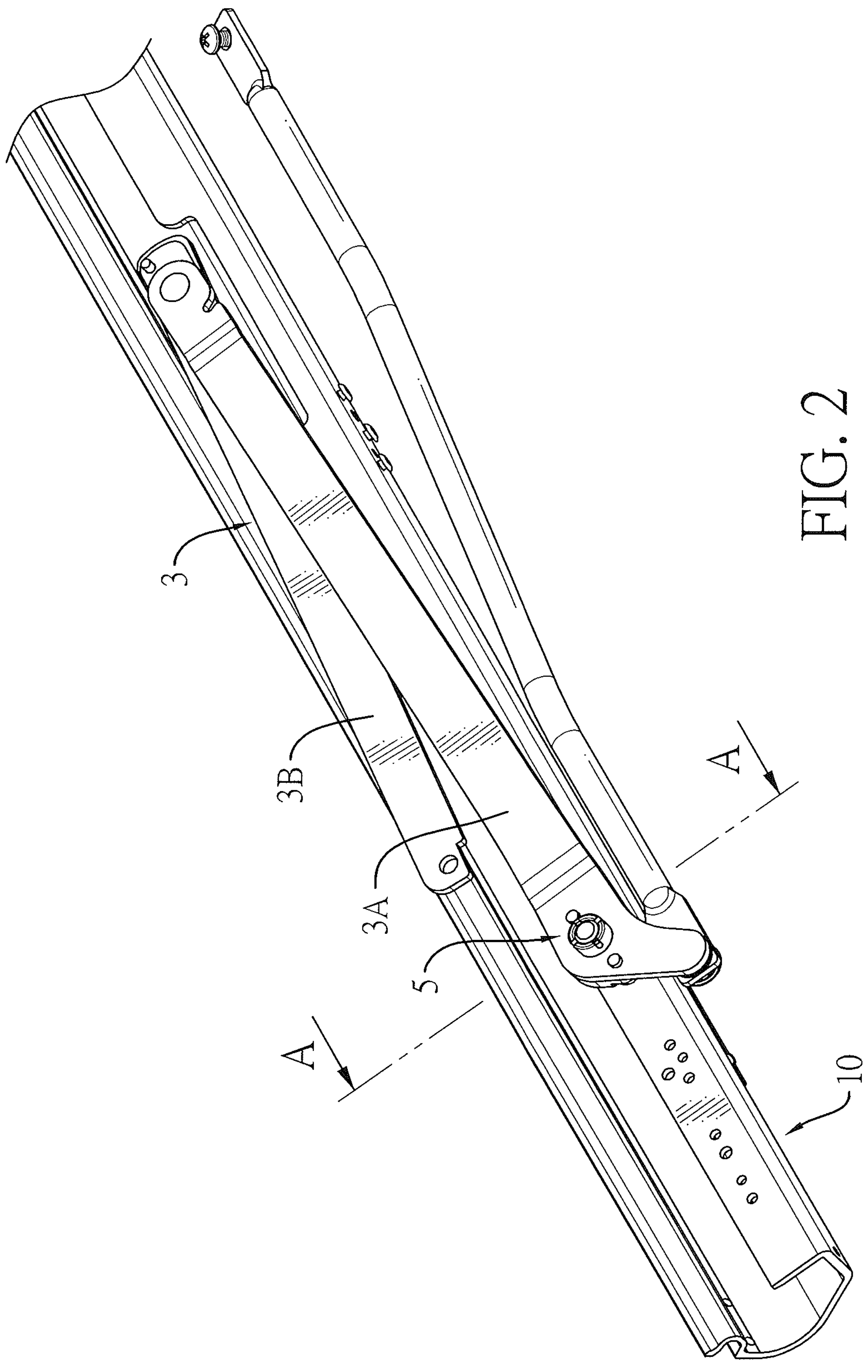
FIG. 2 is an enlarged perspective view of partial curtain buckle device and the car curtain in FIG. 1.

With reference to FIGS. 1 and 2, a preferred embodiment of a curtain buckle device 5 in accordance with the present invention is mounted on a car curtain. The car curtain has a base 1, a curtain structure 2, two linking devices 3 and a driving device 4.

The curtain structure 2 is mounted on the base 1 and has a reel 20, a curtain body 21 and a top stick 22. The reel 20 is pivotally mounted in the base 1. The curtain body 21 is wound around the reel 20 and has two ends. One of the two ends is mounted on the reel 20, and the other end is mounted on the top stick 22. Each linking device 3 is mounted on the base 1 and has two cranks 3A, 3B, and the crank 3A is pivotally connected with the crank 3B. Each linking device 3 is mounted through the curtain buckle device 5 to be pivotally mounted on the base 1 by the crank 3A. The linking devices 3 are connected between the top stick 22 and the driving device 4, such that the driving device 4 can drive the top stick 22 of the curtain structure 2 to move by the linking devices 3. When the top stick 22 moves, the curtain body 21 can be expanded or folded.

Figure 3:
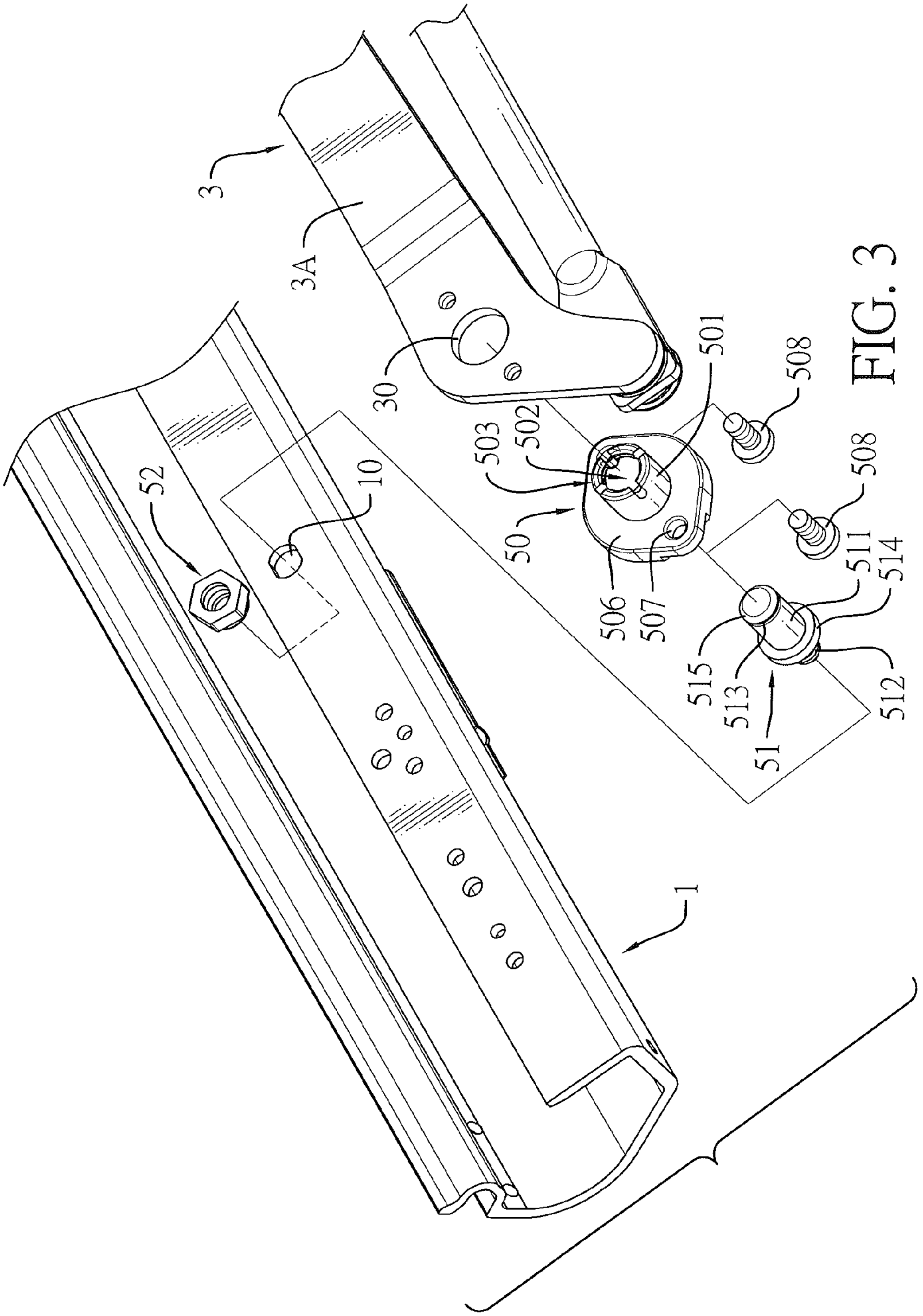
FIG. 3 is an enlarged exploded perspective view of partial of the curtain buckle device and the car curtain in FIG. 1.
Figure 4:
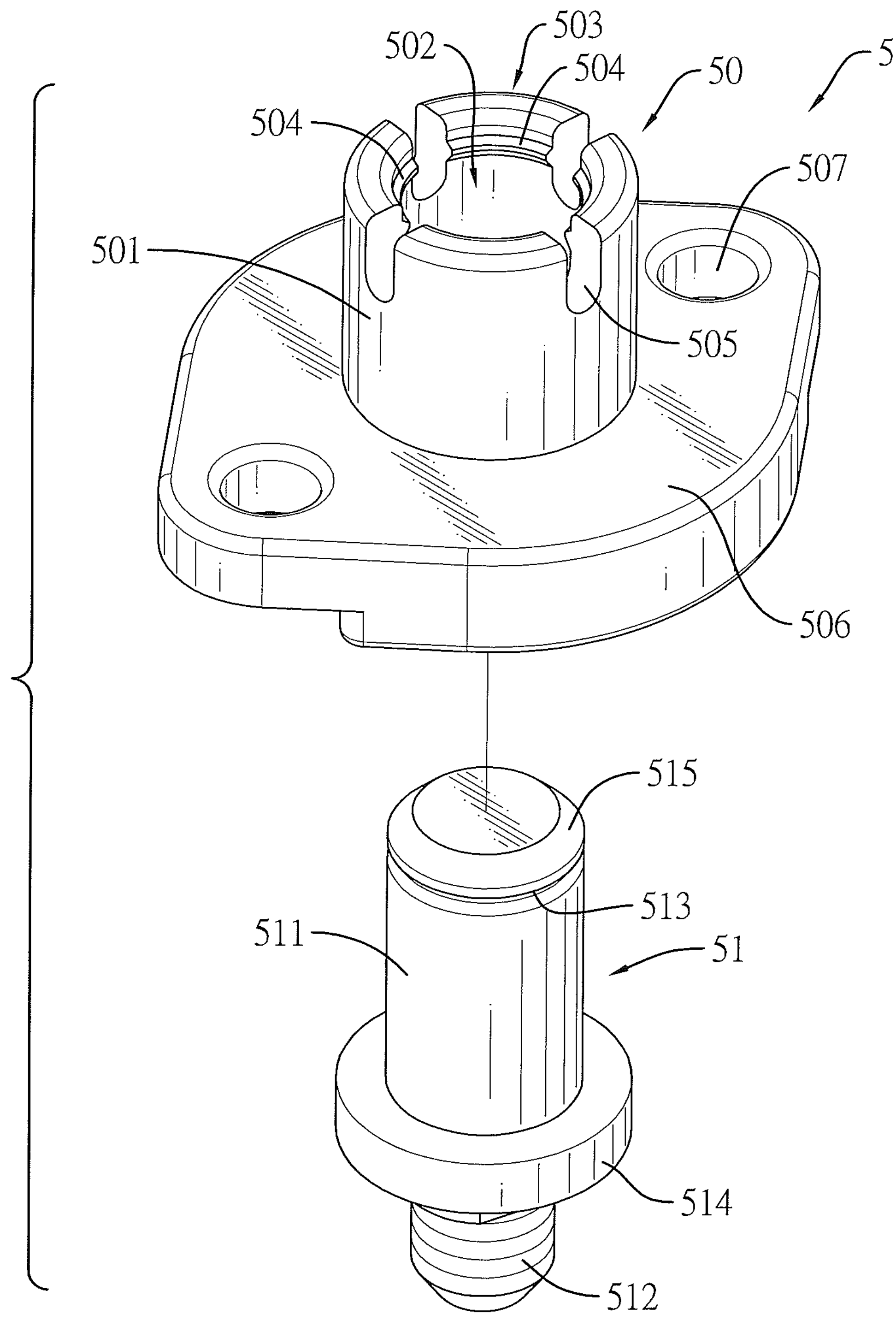
FIG. 4 is an enlarged exploded perspective view of the curtain buckle device in FIG. 1.
Figure 5:
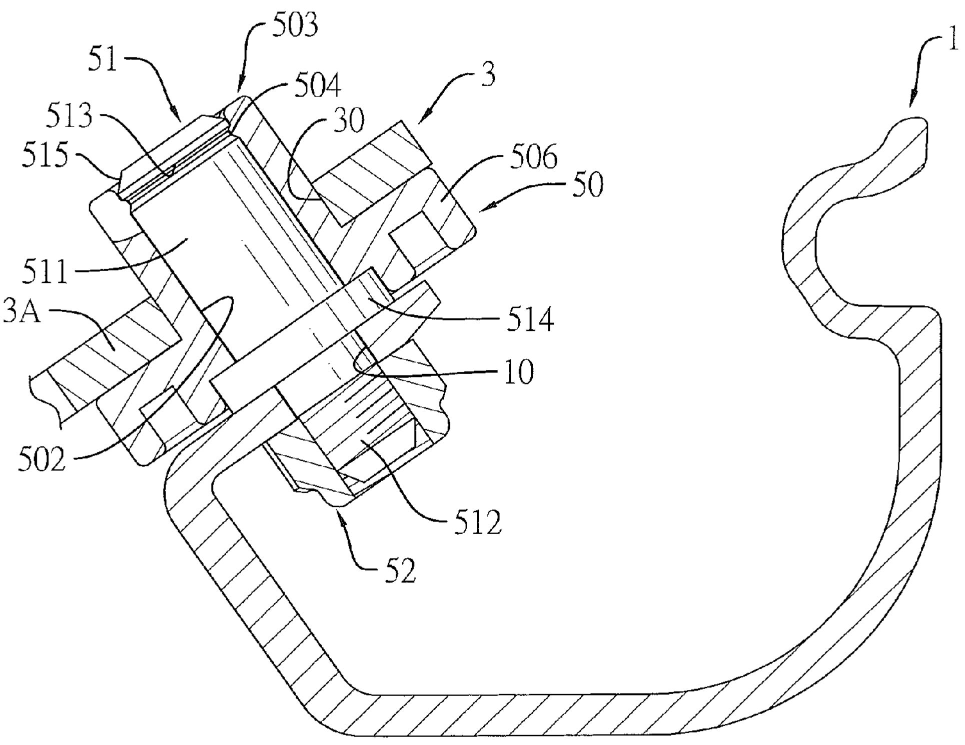
FIG. 5 is a side view in partial section of the car curtain and the curtain buckle device in FIG. 1.
Figure 6:
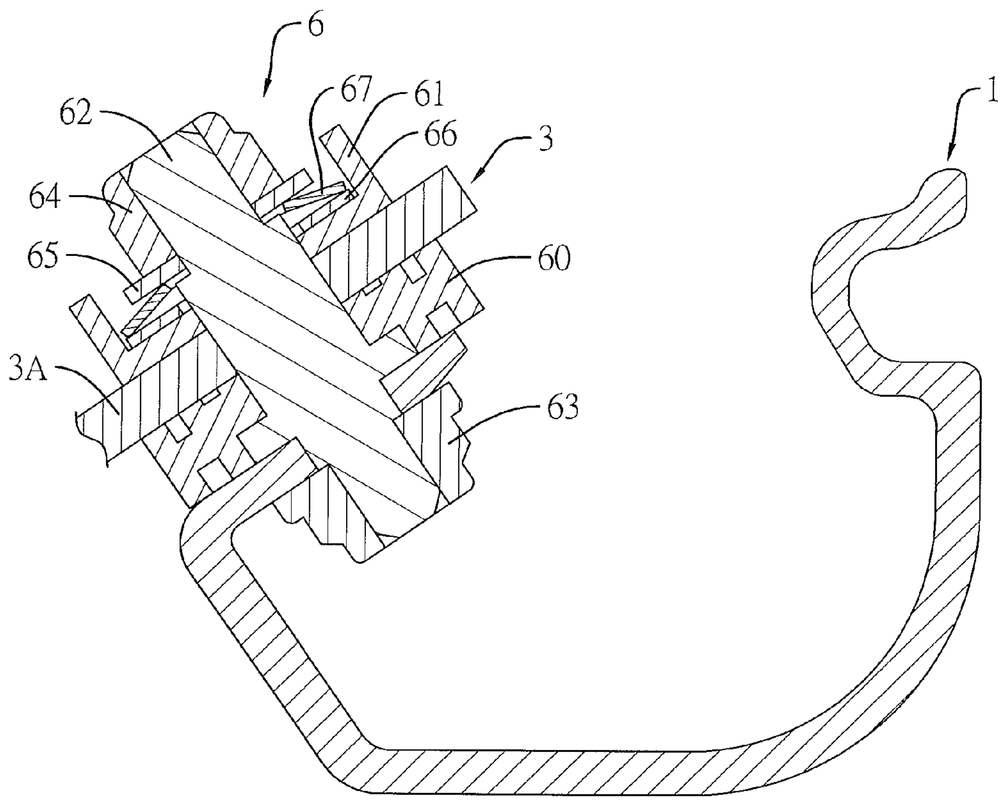
FIG. 6 is a cross sectional side view of a car curtain with a conventional connecting device.

With reference to FIGS. 2 to 4, the curtain buckle device 5 has a buckle unit 50 and a buckle stick 51. The buckle unit 51 has a base portion 506, multiple through holes 507, multiple connecting units 508, a buckle tube portion 501, a buckle hole 502, four slits 505, a buckle claw 503.

The base portion 506 abuts a side of the crank 3A. The through holes 507 are formed through the base portion 506. The connecting units 508 are respectively inserted through the through holes 507 and are combined with the crank 3A, such that the base portion 506 is fixed on the crank 3A. Preferably, the connecting units 508 may be bolts. The buckle tube portion 501 is formed on a side of the base portion 506 and is inserted through an assembling hole 30 of the crank 3A. An area of a cross section of the buckle tube portion 501 is smaller than an area of a cross section of the base portion 506, such that the base portion 506 protrudes out of an outer surface of the buckle tube portion 501. The buckle hole 502 is formed through the buckle tube portion 501 along a longitudinal direction of the buckle tube portion 501. The slits 505 are formed in an end of the buckle tube portion 501 at positions opposite to the base portion 506. The buckle claw 503 is formed on an inner surface of the buckle tube portion 501. The buckle claw 503 protrudes out of the crank 3A, since the buckle tube portion 501 is inserted through the assembling hole 30 of the crank 3A. The buckle claw 503 has multiple claw bodies 504. Each claw body 504 is formed on the inner surface of the buckle tube portion 501 and is located between adjacent slits 505. The buckle claw 503 is elastic along a radial direction due to the slits 505 formed in the end of the buckle tube portion 501.

With reference to FIGS. 2 to 4, the buckle stick 51 is inserted into the buckle tube portion 501 and has a stick body 511, a fixing end 512, a buckle groove 513, an annular flange 514 and a conical surface 515.

The stick body 511 is cylindrical and is inserted into the buckle hole 502. The fixing end 512 is connected with an end of the stick body 511. The fixing end 512 is inserted through a fixing hole 10 of the base 1. Preferably, the fixing end 512 has a threaded structure formed on an outer surface of the fixing end 512. The buckle groove 513 is annularly formed in an outer surface of the stick body 511 at a position opposite to the fixing end 512. The buckle groove 513 is engaged with the claw bodies 504 of the buckle claw 503, such that the buckle unit 50 and the buckle stick 51 are combined with each other. The buckle unit 50 can be rotated relative to the buckle stick 51. When the buckle unit 50 is rotated relative to the buckle stick 51, the crank 3A can be pivoted relative to the base 1. The annular flange 514 is annularly formed around the stick body 511 and is adjacent to the fixing end 512. A diameter of the annular flange 514 is larger than a diameter of the fixing hole 10 of the base 1. Preferably, the fixing end 512 is inserted through the fixing hole 10 of the base 1, and the annular flange 514 abuts a side of the base 1. A nut 52 is mounted on a side of the base 1 and is combined around the threaded structure of the fixing end 512, such that the stick body 511 can be fixed on the base 1. The conical surface 515 is tapered and is formed on the end of the stick body 511 adjacent to the buckle groove 513. The conical surface 515 can assist the stick body 511 to insert into the buckle hole 502.

In use, the buckle unit 50 and the buckle stick 51 are respectively mounted on the crank 3A and the base 1. Then, the stick body 511 is inserted into the buckle hole 502. The end of the stick body 511 pushes the buckle claw 503 to spread outward. The claw bodies 504 are engaged with the buckle groove 513. Thus, the buckle stick 51 can be assembled in the buckle unit 50, and the crank 3A can be fast assembled on the base 1 by the curtain buckle device 5. The claw bodies 504 are engaged with the buckle groove 513, such that the buckle stick 51 cannot be detached from the buckle unit 50. Therefore, the crank 3A can be pivoted relative to the stick body 511 and the base 1 stably.

From the above description, it is noted that the present invention has the following advantages:

1. The buckle unit 50 is mounted on the crank 3A, and the buckle stick 51 is mounted on the base 1. When the crank 3A is mounted on the base 1, the claw bodies 504 is engaged with the buckle groove 513, such that the buckle stick 51 and the buckle unit 50 can be combined with each other fast. The curtain buckle device 5 has only two parts (the buckle unit 50 and the buckle stick 51), such that to assemble the curtain buckle device 5 is easy. Therefore, the assembling process is time-saving, and the cost for the curtain buckle device 5 is reduced.

2. The size and the position of the buckle claw 503 and the buckle groove 513 can be decided according to the tightness demand of the product. Therefore, after the curtain buckle device 5 is assembled on the base 1, the tightness is fixed, such that the crank 3A can be smoothly pivotally mounted on the base 1 by the curtain buckle device 5.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A curtain buckle device connected between a base and a crank of a linking device, with the curtain buckle device having:
- a buckle unit having:
  - a buckle tube portion including an outer surface;
  - a buckle hole formed through the buckle tube portion along a longitudinal direction of the buckle tube portion;
  - multiple slits extending in a radial direction from the buckle hole through the outer surface and formed in an end of the buckle tube portion at intervals; and
  - a buckle claw formed on an inner surface of the buckle tube portion and having multiple claw bodies formed on the inner surface of the buckle tube portion and respectively located between adjacent two of the multiple slits, wherein the buckle claw is elastic along the radial direction due to the multiple slits;
- a buckle stick inserted into the buckle tube portion and having:
  - a stick body being cylindrical and inserted into the buckle hole;
  - a fixing end connected with an end of the stick body; and
  - a buckle groove annularly formed in an outer surface of the stick body at a position opposite to the fixing end, with the buckle groove engaged with the multiple claw bodies, wherein the buckle unit is rotatable relative to the buckle stick.

2. The curtain buckle device as claimed in claim 1, wherein the buckle stick further has a conical surface being tapered and formed on the end of the stick body adjacent to the buckle groove.

3. A curtain buckle device connected between a base and a crank of a linking device, with the curtain buckle device having:
- a buckle unit having:
  - a buckle tube portion;
  - a buckle hole formed through the buckle tube portion along a longitudinal direction of the buckle tube portion;
  - multiple slits formed in an end of the buckle tube portion at intervals;
  - a buckle claw formed on an inner surface of the buckle tube portion and having multiple claw bodies formed on the inner surface of the buckle tube portion and respectively located between adjacent two of the multiple slits;

a base portion connected with an end of the buckle tube portion at a position opposite to the buckle claw, wherein the buckle hole is also formed through the base portion and the base portion is mounted around the stick body via the buckle hole, wherein an area of a cross section of the base portion is larger than an area of a cross section of the buckle tube portion, and wherein the base portion protrudes out of an outer surface of the buckle tube portion;

multiple through holes formed in the longitudinal direction through the base portion; and multiple connecting units respectively inserted through the through holes; and a buckle stick inserted into the buckle tube portion and having:

a stick body being cylindrical and inserted into the buckle hole;

a fixing end connected with an end of the stick body; and a buckle groove annularly formed in an outer surface of the stick body at a position opposite to the fixing end, with the buckle groove engaged with the multiple claw bodies, wherein the buckle unit is rotatable relative to the buckle stick.

4. The curtain buckle device as claimed in claim 3, wherein the buckle stick further has an annular flange annularly formed on the stick body and being adjacent to the fixing end, wherein the fixing end has a threaded structure formed on an outer surface of the fixing end, and wherein the fixing end is combined with a nut to fix on the base.

5. The curtain buckle device as claimed in claim 4, wherein the buckle stick further has a conical surface being tapered and formed on the end of the stick body adjacent to the buckle groove.

6. The curtain buckle device as claimed in claim 3, wherein the buckle stick further has a conical surface being tapered and formed on the end of the stick body adjacent to the buckle groove.

7. A curtain buckle device connected between a base and a crank of a linking device, with the curtain buckle device having:

a buckle unit having:

a buckle tube portion;

a buckle hole formed through the buckle tube portion along a longitudinal direction of the buckle tube portion;

multiple slits formed in an end of the buckle tube portion at intervals; and a buckle claw formed on an inner surface of the buckle tube portion and having multiple claw bodies formed on the inner surface of the buckle tube portion and respectively located between adjacent two of the multiple slits; and a buckle stick inserted into the buckle tube portion and having:

a stick body being cylindrical and inserted into the buckle hole;

a fixing end connected with an end of the stick body;

a buckle groove annularly formed in an outer surface of the stick body at a position opposite to the fixing end, with the buckle groove engaged with the multiple claw bodies, wherein the buckle unit is rotatable relative to the buckle stick; and an annular flange annularly formed around the stick body and being adjacent to the fixing end, wherein the fixing end has a threaded structure formed on an outer surface of the fixing end, and wherein the fixing end is combined with a nut to fix on the base.

8. The curtain buckle device as claimed in claim 7, wherein the buckle stick further has a conical surface being tapered and formed on the end of the stick body adjacent to the buckle groove.

* * * * *